United States Patent [19]

Marchal

[11] Patent Number: 4,460,157
[45] Date of Patent: Jul. 17, 1984

[54] HIGH PRESSURE BALL VALVE

[75] Inventor: Francis V. Marchal, Erie, Pa.

[73] Assignee: Skinner Engine Company, Erie, Pa.

[21] Appl. No.: 334,871

[22] Filed: Dec. 28, 1981

[51] Int. Cl.³ .............................................. F16K 5/06
[52] U.S. Cl. .................................. 251/315; 251/366;
29/157.1 R; 29/447
[58] Field of Search ............... 251/315, 366, 309, 312,
251/314, 148, 152, 367; 29/157.1 R, 447;
137/318

[56] References Cited

U.S. PATENT DOCUMENTS

| 587,107 | 7/1897 | Sherrerd | 137/318 |
| 1,216,657 | 2/1917 | Cardell | 29/447 |
| 2,732,169 | 1/1956 | Matteo | 251/367 |
| 3,091,428 | 5/1963 | Magos | 251/367 |
| 3,096,965 | 7/1963 | Margus | 251/315 |
| 4,175,580 | 11/1979 | Kalbfleisch | 251/315 |

Primary Examiner—Martin P. Schwadron
Assistant Examiner—James R. Shay
Attorney, Agent, or Firm—Charles L. Lovercheck;
Wayne L. Lovercheck; Dale R. Lovercheck

[57] ABSTRACT

A valve is disclosed having a generally cylindrical body having an inlet and an outlet opening and a lateral opening. The valve body is received in a cylindrical collar which is heat shrunk onto the cylindrical body of the valve to provide a prestressed condition in the valve body thereby substantially increasing the strength of the body.

14 Claims, 5 Drawing Figures

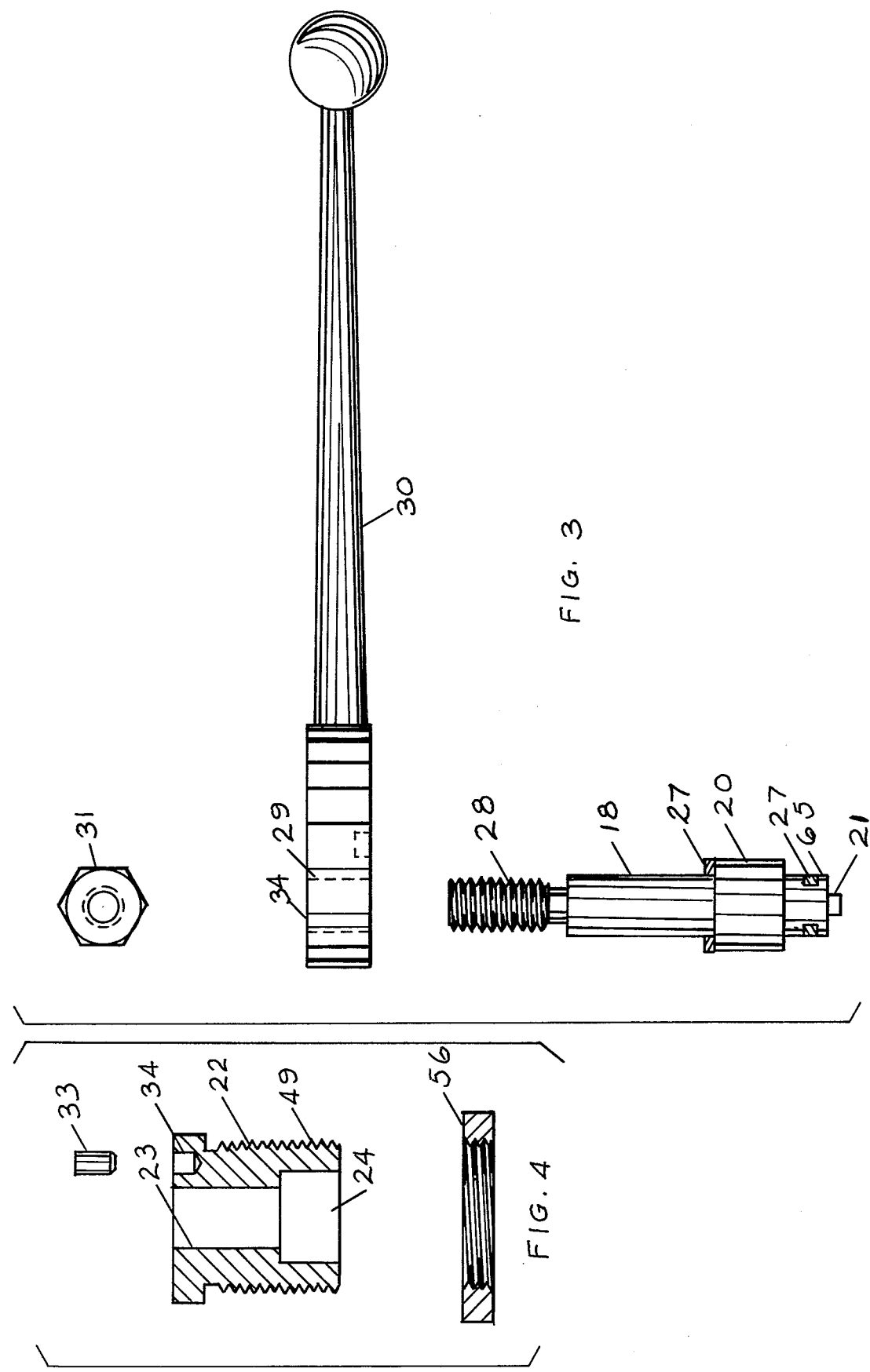

HIGH PRESSURE BALL VALVE

CROSS REFERENCE TO RELATED APPLICATIONS

There are no related patent applications filed in the name of applicant.

BACKGROUND OF THE INVENTION

This invention is in the field of valves and more particularly to the type of valves known as ball valves and is especially suitable for operation at relatively high pressures; for example, at 20,000 pounds per square inch.

REFERENCE TO PRIOR ART

The following United States patents are known to applicant and are found in the field of ball valves, however, none of these patents show the particular collar heat shrunk onto the valve body to increase its strength, nor do they show the particular plug gland support for the spherical valve member or the particular valve stem structure utilized in the valve herein.

| U.S. Pat No. | Issued | Inventor |
| --- | --- | --- |
| 3,038,693 | June 12, 1962 | Robert P. Dumm |
| 3,269,692 | August 30, 1966 | Homer J. Shafer |
| 3,531,082 | September 29, 1970 | Domer Scaramucci |
| 3,671,010 | June 20, 1972 | Domer Scaramucci |
| 4,111,229 | September 5, 1978 | Timothy T. Christian |
| 4,103,865 | August 1, 1978 | Kamori Nanba, et al. |
| 4,124,036 | November 7, 1978 | Phillip W. Rogers |
| 4,160,460 | July 10, 1079 | Willard E. Kemp |
| 4,175,577 | November 27, 1979 | Gary W. Kacal |
| 4,236,691 | December 2, 1980 | Joseph B. Wright |

None of these patents show a valve having the improvements of the valve disclosed herein.

SUMMARY OF INVENTION

The valve disclosed herein is designed to withstand extreme pressures and temperatures. Due to the geometry of the valve configuration, it is able to attain a most favorable flow pattern having virtually no pressure drop across the valve due to the cross sectional area of the flowpath therethrough.

The structural integrity of the valve is usually efficient. The body may be thought of as a thick wall shell pressure vessel. The valve body being encased in a collar type ring precisely machined to accept the body and is centrally located about the valve assembly. Due to the compactness of the design, very favorable physical properties of the valve can be obtained. Thus, the valve may be provided with conservative safety factors in a relatively compact design. The valve design disclosed gives a lighter, stronger and less expensive product.

The valve disclosure has the following advantages over the block shaped conventional valves.

1. The pressure drop across the valve is minimum since the flow pattern is transmited in the linear pattern.

2. The material size of the pressure retaining members considerably reduced due to its geometric configuration.

3. The valve body is encased in a centrally positioned collar which retains the turning ball stem.

4. The turning ball stem is so designed that it is nested in a counter bore of the retainer gland, structurally restraining this part from blow-out, due to its geometric configuration.

5. The stem retaining gland is proportioned so that the stress level in the external threads are minimized.

6. The mass of the valve is decreased substantially due to its compactness of design.

7. Automatic operation is efficiently accomplished, and manually operated valves can be converted to automatic operation by removing the manual handle and mounting a rotating operator on the valve.

When the basic cylindrical body is no longer practical to withstand the necessary pressure due to adequate wall ratio or physical strength properties of the material, a cylindrical collar is shrunk onto the valve body, thus we now have a multilayer vessel. The advantage of this construction is well known to the state of the art of thick wall pressure design.

The theory of the multi-layer valve body is as follows:

The outer shell or collar is machined undersize of the cylindrical body, then the collar is heated to a pre-determined temperature expanding the diameters to allow the inner shell of the valve body to be slipped into the collar without use of mechanical force.

As the collar cools, the outer diameter of the collar shrinks and exerts a compressive stress at the transition between the outer shell and the inner body. Therefore, internal pressurization of the inner shell or inner body, the induced negative stresses at the transitional wall become zero. This favorable stress condition plus the metal mass surrounding the stem side wall opening results, in a most favorable stress pattern at this area.

GENERAL DESCRIPTION OF DRAWING

FIG. 3 is an exploded view of some of the other valve parts.

FIG. 4 is an enlarged cross sectional view of certain parts of the invention.

DETAILED DESCRIPTION OF DRAWING

Figure 1:
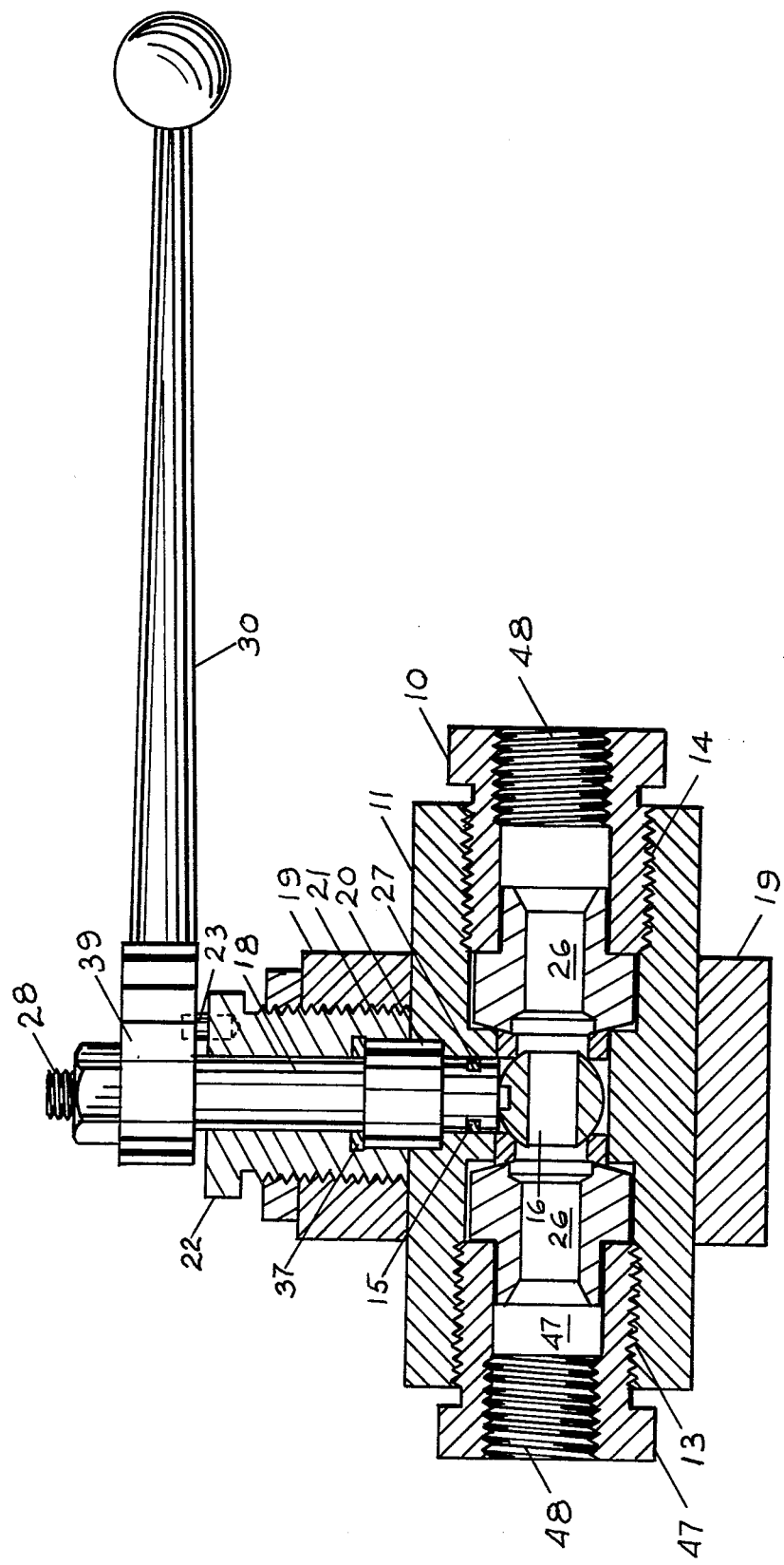
FIG. 1 is a longitudinal cross sectional view of the valve according to the invention.
Figure 2:
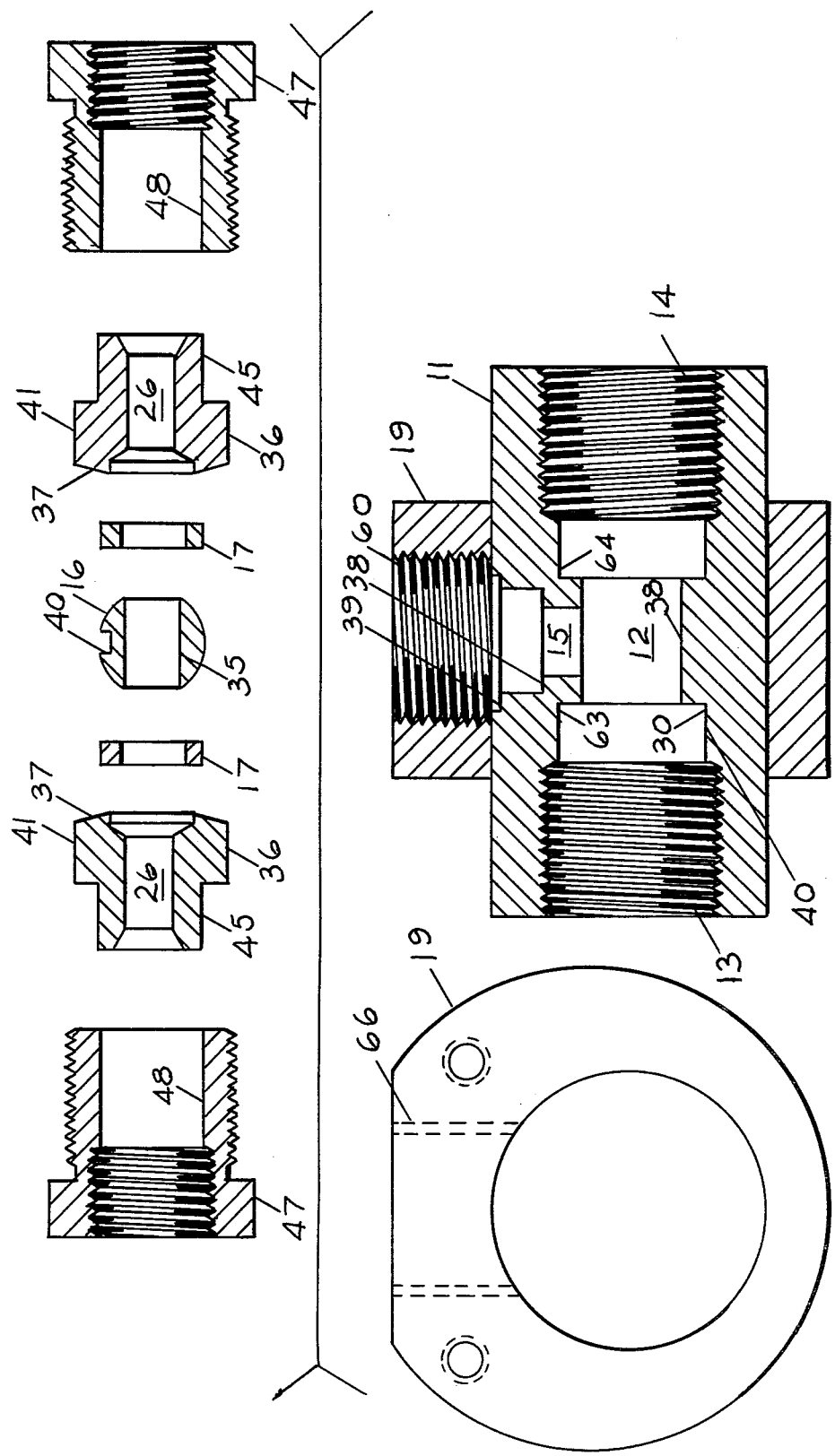
FIG. 2 is an exploded view of some of the valve parts.
Figure 5:
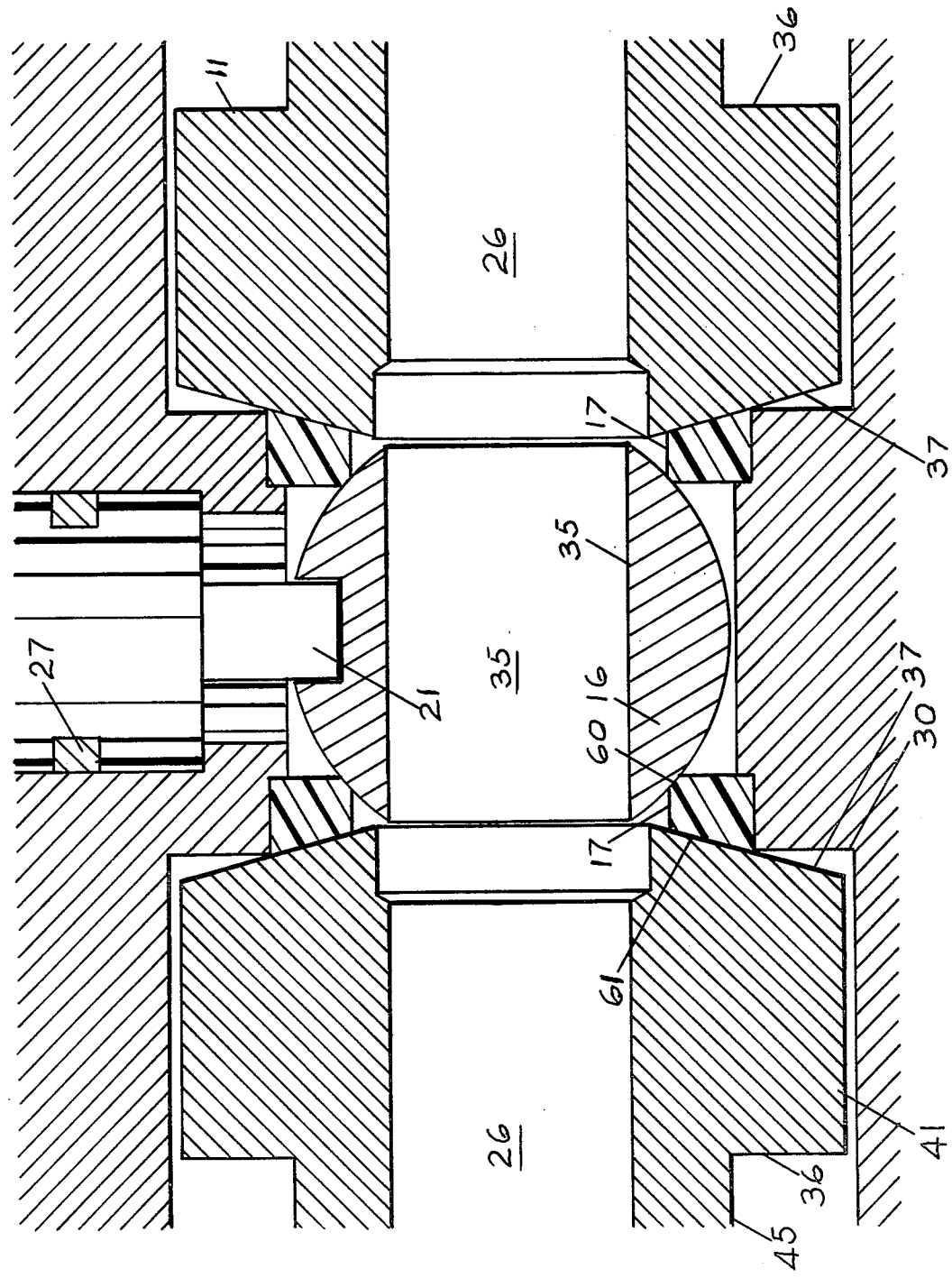
FIG. 5 is an enlarged longitudinal cross section partial view of a part of the valve shown in the other figures.

Now with more particular reference to the drawing, the valve 10 has the valve body 11 having a bore 12 through said body 11. The body had a cylindrical outside surface of a precise diameter to receive the collar 19. The body has a first counterbore 63 and a second counterbore 64 one at each side of bore 12, and first threaded counterbore 13 forms an inlet and second threaded counterbore 14 forms an outlet from the valve body.

The valve may be connected in a flow line within the inlet 13 is connected to one part of the fluid line and the outlet 14 is connected to the other part of the flow line. The lateral opening 15 in the body communicates with the opening 21 in the collar 19. A lateral bore 15 is formed in the body communicating with bore 12. Lateral bore 15 has first counterbore 38 and second counterbore 39.

Ball 35 is received in bore 12 and stem 18 is received in bore 15 as will be explained.

The stem 18 has a non-circular shaped end 21 that is received in a complimentary shaped hole in the top of the ball valve member 16, and the lower end 65 is received in bore 15. The stem 18 has the enlarged cylindrical part 20 which is received in first counterbore 38 and thrust washer 37 is received on the stem 18 which rests on the upper surface of enlarged cylindrical part 20.

The lower end 65 of the stem 18 has a groove that receives the stem seal 27. The stem has a threaded upper end 28 that is received in the hole 29 in handle 30. The threaded end 38 extends through the hole 29, and holds the handle 30 in place and a locknut 31 may lock the handle in place.

The collar 19 has an inside cylindrical surface having an inside diameter slightly smaller than the outside diameter of body 11 so that when heated the collar will slip onto body 11 and when cooled collar 19 will shrink onto body 11 and introduce a prestress in the body 11. Collar 19 has a threaded bore 60 which is concentric with bore 15.

The stem gland 22 is threadably received in threaded bore 60 in collar 19. The stem 18 extends through a bore 23 in the gland 22, and a stop pin 33 extends through the arcuate slot 34 in the handle and receives the pin 33 which is set in the opening 34 in the gland; thus, the handle may be moved approximately 90° thereby loosening the gland 22 when the pin 33 reaches the end of the slot 34 and in moving the handle in the opposite direction, the valve opening 35 will move out of alignment with the bores 26. Two plug members 36 are provided and two plug glands are provided. Each plug 41 is threadably received in one of the threaded counterbores 13 and 14. Each plug 47 has a bore 48 which receives the cylindrical end 45 of a plug 36. Plug 36 has a central bore 26 which forms a part of a flow passage, and a headed end 41. The head on the end of each plug 36 is received in one of the counterbores 63 and 64.

The plug members each have a convex inner end 37 which the ball seals 17 rest upon, and when pressed into contact with the ball 16 by tightening the glands 47, the plugs 36 will force the seals 17 into engagement with a convex end 37 of the plug 36 and into engagement with the ball 16. The gland 22 is locked in a proper position by means of the gland nut 22. The pressure chamber in said valve body may be considered to be the flow passage through the valve between the two plugs 47 that are used for connecting the valve into the fluid line. This is the chamber that the ends of the sleeve overlie. The plugs 47 reinforce the body outside the pressure chamber.

The ball 16 has an axial bore 35 therein which communicates with the bores in each plug 36 and forms with bore 26 in each plug 36 a flow path of uniform cross section. The ball 16 has a non-circular opening 40 which receives the end 21 of the turning stem 18.

The stem is threaded to its upper most end for fastening either a manual turning handle 30 or a TWE driver for automatic operation of the valve when a rotary operator is used.

The spherical Elastomer Seal is in the form of a ring machined to fit the ball 35 on the inboard side and the cover profile 37 on the outboard side.

The ball retaining plugs 36 are designed so that a metal to metal seal is provided at the valve body. The inboard face of the plugs 36 serve as a support surface for the ball seal 17. The outboard end is machined to accept a high pressure cone tubing connector. The part is centrally drilled through for passage of the media through the valve. The plug glands 47 are internally drilled to accept the neck 45 of the ball retaining plugs 36. The plug glands are externally threaded to be received in the threaded inlet and in the threaded outlet end 12 and 14 respectively. The stem seal 27 is commercially available. The seal 17 is best shown in FIG. 4. It will be seen from an inspection of the drawings that the valve 10 is composed of a body 11 with a flow passage 12 through body 11 and an inlet opening 13 and an outlet opening 14 in the body connected to a flow passage 12. A lateral opening 15 communicates with the flow passage 12. The valve seals are provided in the body at each side of the lateral opening. These valve seals as shown are annular members having a spherical sealing surface 60 engaging the outer periphery of the ball 16 and having an end surface 61 engaging the surface 37 of the plugs 36. The ball is supported between the seal members 17 and may be rotated by the stem 18 which has the noncircular member 21 on its lower end and it is received in the slot 21 in the ball.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a one piece valve body,
   connecting means on the ends of said body for connecting said body in a fluid flow line,
   a flow passage through said body between said connecting means,
   said flow passage between said connecting means comprising a pressure chamber,
   an inlet opening and an outlet opening to said body communicating with said flow passage,
   a lateral opening in said body,
   valve seat means in said body at each side of said lateral opening,
   a ball valve member supported on said seat members and a collar extending around said body substantially overlying the pressure chamber and tightened thereon whereby compressive stress is exerted on the outer periphery of the pressurized chamber in said body providing a pre-stress in said collar whereby the tensil strength of the pressurized portion of said body is increased.

2. The valve recited in claim 1 wherein said valve member is circular cross section.

3. The valve recited in claims 1 or 2 wherein said collar is heat shrunk on the said body.

4. The valve recited in claim 1 wherein said seat means comprises an annular member formed on its inner end to engage said ball and formed on its outer end to engage plug means.

5. The valve recited in claim 2 wherein said valve member has a cylindrical opening therethrough and said cylindrical opening is aligned with said flowpath when said valve is in open position and disposed transverse to said flowpath when said valve is in closed position,
   said flow passage through said valve is substantially when cross-sectional through said valve from inlet to outlet.

6. The valve recited in claim 5 when said valve member is generally spherical in configuration.

7. The valve recited in claim 6 wherein said ball seal has an inside surface machined to conform to the outside surface of said valve support and an inside surface machined in a spherical configuration to engage said ball valve.

8. A valve comprising a one piece valve body in a fluid flow line,
  a flow passage in said body,
  said valve having a chamber adapted to be subjected to fluid pressure,
  an inlet opening and an outlet opening to said body communicating with said flow passage,
  a lateral opening in said body,
  valve seat means in said body at each side of said lateral opening,
  a ball valve member supported on said set members and a collar extending around said body and tightened thereon,
  whereby compressive stress is exerted on the outer periphery of said body providing a pre-stress in said body over substantially the entire outside surface of the portion of said body which overlies said pressure chamber,
  a stem extending through said collar and connected to said ball,
  said stem having an enlarged cylindrical member thereon and spaced upwardly from the lower end thereof,
  said lower end of said stem having a non-circular portion engaging said ball,
  a stem gland,
  said stem gland having a bore therethrough receiving said stem and a counter bore receiving said enlarged portion,
  said stem gland being threadably received in said collar.

9. The valve recited in claim 8 wherein said stem gland is threadably received in said lateral opening,
  and a thrust washer is disposed on said stem,
  said thrust washer engaging said stem gland.

10. The valve recited in claim 8 wherein said seat means comprises a first plug and the second plug said first plug being disposed in said inlet and said second plug being received in said outlet adjacent to said valve member,
  a sealing ring supported on said plug and threaded means in said inlet and in said outlet for holding said plugs towards said ball member.

11. The valve recited in claim 10 wherein said rings each have a surface adjacent said ball preformed to conform to the outside surface of said ball,
  and a second surface preformed to conform to the end surface of said plugs.

12. A method of making a valve comprising providing a one piece valve body adapted to be connected in a fluid flow line, having a flow passage therethrough and an outside generally cylindrical surface,
  providing connecting means on said body for connecting said body in a fluid line,
  providing a collar having an inside surface conforming generally to said outside surface, said collar having an inside diameter at room temperature substantially smaller than the outside diameter of said body, said collar being of substantially the same length as the inside portion of said body between said connecting means,
  heating said collar to a temperature sufficient to expand said collar to receive said body,
  inserting said body into said collar,
  cooling said collar to shrink said collar onto said body and assembling valve parts into said body thereby providing a complete valve.

13. A ball valve comprising a one piece body,
  connecting means on its ends of said body adapted to connect said body in a fluid flow line,
  said body having a bore therethrough a ball in said bore,
  said bore between said connecting means comprising a pressure chamber,
  a first plug and a second plug,
  said plugs being disposed in said bore,
  means supporting said plugs in said bore in spaced relation to each other with said ball therebetween,
  each said plug having a convex end surface adjacent said ball, two rings,
  one said ring being disposed at each side of said ball between said ball and the plug adjacent thereto,
  each said ring having a first end contoured to rest on the said convex surface of said plug and a second end surface contoured to rest on the outer surface of said ball,
  said rings being made of a nonmetallic material forming a seal with said ball and with said plugs,
  a collar extending around said body and tightened thereon and engaging the outside of body continuously over said pressure chamber whereby compressive stress is exerted on said body over the said pressurized chamber, providing a prestress in said body whereby the tensil strength of said body is increased.

14. The valve recited in claim 13 wherein said ball and said plugs having a bore therethrough,
  means to rotate said ball to bring said bore into and out of alignment with said bore through said plugs.

* * * * *